United States Patent Office 2,863,885
Patented Dec. 9, 1958

2,863,885

17-ISONITROSOANDROSTANES

John C. Babcock, Portage Township, Kalamazoo County, Mich., assignor to The Upjohn Company, Kalamazoo, Mich., a corporation of Michigan No Drawing. Application February 10, 1958
Serial No. 714,074

6 Claims. (Cl. 260—397)

This invention relates to 17-isonitrosoandrostanes and is more particularly concerned with 17-isonitrosoandrostane, 17-isonitrosoandrostan-11α-ol, 17-isonitrosoandrostan-11β-ol, 17-isonitrosoandrostan-11-one and 17-isonitroso-9(11)-androstene.

The novel compounds of the present invention are illustratively represented by the following formula:

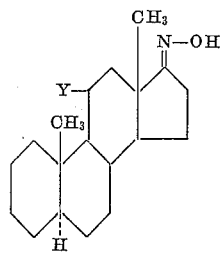

wherein Y is selected from the group consisting of hydrogen, α-hydroxy, β-hydroxy and keto. Also included in the novel compounds of the present invention is 17-isonitroso-9(11)-androstene. The compounds of the present invention are prepared from the corresponding 17-keto-steroids by oximation, for example with hydroxylamine hydrochloride in solution in an amine such as morpholine or pyridine, wherein the amine serves as a base, or in alcohol or other suitable organic solvent in the presence of an alkali metal base such as sodium acetate, potassium hydroxide, and the like.

It is an object of the present invention to provide 17-isonitrosoandrostanes, particularly 17-isonitrosoandrostane, 17-isonitrosoandrostan-11α-ol, 17-isonitrosoandrostan-11β-ol, 17-isonitrosoandrostan-11-one and 17-isonitroso-9(11)-androstene. A further object of the present invention is to provide processes for the production of 17-isonitrosoandrostanes, particularly 17-isonitrosoandrostane, 17-isonitrosoandrostan-11α-ol, 17-isonitrosoandrostan-11β-ol, 17-isonitrosoandrostan-11-one and 17-isonitroso-9(11)-androstene.

The novel compounds of the present invention are central nervous system depressants useful as sedatives or tranquilizing agents. The compounds of the invention have the advantage over the parent compounds of greatly increased central nervous system depressant activity, frequently coupled with a decrease in hormonal activity. For example, in the sleep potentiation test 17-isonitrosoandrostan-11β-ol when administered to rats in descending doses of twenty, ten, five and 2.5 percent of the LD₅₀ gave corresponding increases of sleeping time of 1120, 744, 679 and 428 percent. On the other hand the parent compound, 11β-hydroxyandrostan-17-one, in diminishing doses of twenty, ten and five percent, as above, gave increases of sleeping time of 141, 161 and 105 percent. 17-isonitrosoandrostan-11-one, administered in a dose of 2.5 percent of LD₅₀, gave a sleeping time increase of 366 percent while the parent compound, androstane-11,17-dione, gave an increase in sleeping time of 85 percent at the same dosage level.

The compounds of the present invention also possess the property of potentiating the activity of steroid cortical hormones such as hydrocortisone. They further possess activity as antibacterial, antifungal, antiestrogenic, antiinflammatory, gonadotropin inhibiting, anabolic and salt and water regulating agents. Administration of the novel steroids can be in conventional dosage forms such as pills, tablets, capsules, syrups or elixirs for oral use, or in liquid forms which are adaptable to the natural and synthetic cortical steroid hormones for injectable products. The novel compounds can also be administered topically in the form of ointments, creams, lotions and the like, with or without coacting antibiotics, germicides, or other materials forming advantageous combinations therewith.

The starting steroids for the compounds and process of the invention are androstan-17-ones, particularly androstan-17-one, 11α-hydroxyandrostan-17-one, 11β-hydroxyandrostan-17-one, androstane-11,17-dione and 9(11)-androsten-17-one, and are prepared in accordance with Preparations 1 through 6 herein.

The process of the present invention comprises treating androstane-17-ones with hydroxylamine, and carrying out the process of the invention the starting steroid can be treated directly with hydroxylamine, preferably in a suitable solvent such as an alkanol or amine; or an hydroxylamine mineral acid salt, such as hydroxylamine hydrochloride or hydroxylamine sulfate, can be used, in which case a basic reagent, such as pyridine, sodium acetate, or sodium hydroxide can be added to the reaction mixture, thus liberating hydroxylamine as the free base. An excess of hydroxylamine, usually from two to six molar equivalents is preferably employed.

The oximation reaction is preferably carried out at twenty to 120 degrees centigrade, and conveniently at the boiling point of the solvent employed. Under these conditions the reaction time is usually from fifteen minutes to eight hours. Both higher and lower temperatures and shorter and longer reaction times are operative, the lower temperature usually requiring a correspondingly longer reaction time.

The product can be isolated, for example, by pouring the reaction mixture into water and separating the resulting precipitate by filtration. In the preferred process of the invention the starting steroid and an equal weight of hydroxylamine hydrochloride or hydroxylamine sulfate are dissolved in an amine base, for example pyridine, and heated to 85 to 100 degrees centigrade for from two to six hours, then the reaction mixture is poured into a large volume of water and the precipitated 17-isonitrososeteroid is recovered by filtration.

9α-fluoro-17-isonitrosoandrostan-11β-ol and 9α-fluoro-17-isonitrosoandrostan-11-one can be produced from 9(11)-androsten-17-one (Preparation 5) by a process which comprises treating the latter compound with a hypochlorous or hypobromous acid, e. g., with N-bromoacetamide or N-chloroacetamide in the presence of aqueous perchloric acid, to obtain 9α-chloro or 9α-bromo-11β-hydroxyandrostan-17-one; treating the latter compound with a mild base such as potassium acetate, sodium bicarbonate, or the like to obtain 9β,11β-oxidonandrostan-17-one; treating the thus obtained 9β,11β-oxide with hydrogen fluoride either as a gas or liquified at low temperature, or with aqueous hydrofluoric acid in solution to obtain 9α-fluoro-11β-hydroxy-androstan-17-one, oxidizing the latter compound with for example chromium trioxide in aqueous acetic acid to obtain 9αfluoroandrostane-11,17-dione, and treating the latter two compounds individually with hydroxylamine hydrochloride in pyridine to obtain 9α-fluoro-17-isonitrosoandrostan-11β-ol and 9α-fluoro-17-isonitrosoandrostan-11-one, respectively. The 9α-fluoro-17-isonitrosoandrostanes exhibit antibacterial, antifungal, central nervous system depressant, antiestrogenic, antiinflammatory, anabolic, androgenic and hypotensive activities.

The 9α-fluoro-17-isonitrosoandrostanes can be administered in conventional dosage forms such as pills, tablets, capsules, syrups, or elixirs for oral use, or in liquid forms which are adaptable to the natural and synthetic cortical steroid hormones for injectable products. The novel compounds can also be administered topically in the form of ointments, creams, lotions and the like, with or without coacting antibiotics, germicides, or other materials forming advantageous combinations therewith.

Reduction of the novel compounds of the present invention is productive of the corresponding 17-aminoandrostanes. For example, treating 17-isonitrosoandrostan-11β-ol dissolved in a mixture of ether, isopropyl alcohol, and liquid ammonia with lithium is productive of 17β-aminoandrostan-11β-ol. Similarly reduction of 17-isonitrosoandrostane, 17-isonitrosoandrostan-11α-ol, and 17-isonitroso-9(11)-androstene with lithium in liquid ammonia is productive of 17β-aminoandrostene, 17β-aminoandrostan-11α-ol, and 17β-amino-9(11)-androstene. The above 17β-amines exhibit antibacterial, antifungal, central nervous system depressant, antiestrogenic, anti-inflammatory, anabolic, androgenic, and hypotensive activities. Fluosilicate salts of the above amines are useful as moth proofing agents in accordance with U. S. Patents 1,915,334 and 2,075,359. Also in accordance with U. S. Patents 2,425,320 and 2,586,331, the thiocyanate salts of the above amines can be condensed with formaldehyde and other aldehydes to form useful pickling inhibitors.

The following preparations and examples are illustrative of the products and process of the present invention and are not to be construed as limiting.

PREPARATION 1

*11,20-diketo-3,5-pregnadiene*

A mixture of eighteen grams of freshly prepared Raney nickel catalyst and 250 milliliters of acetone was refluxed for one hour. To the solution was then added 1.8 grams of the 3-benzyl thioenol ether of 11-ketoprogesterone (U. S. Patent 2,698,852) and the mixture was refluxed for four more hours. The cooled solution was filtered and the filtrate distilled at reduced pressure until crystallization of the product occurred. The crystals thus obtained were recrystallized from a mixture of acetone and heptane to give 11,20-diketo-3,5-pregnadiene melting at 138 to 142 degrees centigrade. A second crystallization of these crystals raised the melting point to 141.5 to 143 degrees centigrade. This product showed ultraviolet absorption maxima, $a_M$, of 17,200 at 228 mμ, 18,200 at 234 mμ, and 11,315 at 242 mμ, and $[\alpha]_D^{23}$ of plus 41 degrees in chloroform and the analysis below:

*Analysis.*—Calculated for $C_{21}H_{28}O_2$: C, 80.73; H, 9.03. Found: C, 80.59; H, 9.13.

PREPARATION 2

*Allopregnane-11,20-dione*

A solution of 2.5 grams of 11,20-diketo-3,5-pregnadiene in 100 milliliters of ethyl acetate containing 1.25 grams of a five percent palladium on charcoal catalyst was shaken in a hydrogen atmosphere. The theoretical uptake was rapid and complete. The solution was then filtered and the filtrate distilled to a small volume and then diluted with methanol until crystallization commenced. There was thus obtained 1.72 grams of allopregnane-11,20-dione as plates which melted at 139.5 to 141 degrees centigrade, had an $[\alpha]_D$ of plus 122 degrees in chloroform, and the analysis below:

*Analysis.*—Calculated for $C_{21}H_{32}O_2$: C, 79.69; H, 10.19. Found: C, 79.60; H, 9.97.

A mono-2,4-dinitrophenylhydrazone was prepared which melted at 209 to 210 degrees centigrade.

PREPARATION 3

*Androstane-11,17-dione*

A solution of 1.2 grams of allopregnane-11,20-dione in 150 milliliters of acetic anhydride containing 0.75 gram of paratoluenesulfonic acid was slowly distilled over a period of four hours to about half its original volume. The remaining acetic anhydride was then distilled at reduced pressure. The residual dark oil of the enol acetate of allopregnane-11,20-dione was dissolved in methylene chloride. The solution was washed free of acid with aqueous sodium bicarbonate and then evaporated to dryness. The residue was dissolved in 200 milliliters of ethyl acetate and the resulting solution was cooled to about zero degrees centigrade and then ozonized with 4.9 millimoles of ozone. The solution was then mixed with fifty milliliters of acetic acid and five grams of zinc dust for two hours. The mixture was filtered and the ethyl acetate solution washed with aqueous sodium bicarbonate and then with water and finally dried. The dry solution was evaporated to dryness leaving a pale yellow oil which was purified by chromatography over a column of Florisil synthetic magnesium silicate. The column was developed with one liter portions of solvents of the following composition and order: five of petroleum ether, one of petroleum ether plus two percent acetone, one of petroleum ether plus 2.5 percent acetone, and one of petroleum ether plus five percent acetone. The petroleum ether plus two percent acetone eluate contained a thin oil which resisted crystallization. This oil was heated with three percent methanolic sodium hydroxide and the mixture was freed of solvent and then mixed with water to give androstane-11,17-dione which, after crystallization from methanol and water, was obtained as either flat needles or plates melting at 129 to 129.5 degrees centigrade. These crystals had an $[\alpha]_D^{23}$ of plus 139 degrees in chloroform and the analysis below:

*Analysis.*—Calculated for $C_{19}H_{28}O_2$: C, 79.12; H, 9.78. Found: C, 79.67; H, 10.05.

A mono-2,4-dinitrophenylhydrazone was obtained which melted at 283 to 284 degrees centigrade.

PREPARATION 4

*11β-hydroxyandrostan-17-one*

A mixture of 25 grams of androstane-11,17-dione (from Preparation 3), 1.25 grams of paratoluenesulfonic acid, 500 milliliters of benzene and fifty milliliters of ethylene glycol was stirred and heated under reflux for eight hours, by which time the theoretical amount of water had been removed by azeotropic distillation. The reaction mixture was cooled, 3.5 milliliters of pyridine was added, and the benzene and glycol layers were separated. The benzene layer was washed with aqueous sodium bicarbonate, then water, dried over sodium sulfate, and evaporated to dryness giving a residue containing androstane-11,17-dione 17-ethylene ketal. The thus obtained residue was dissolved in 200 milliliters of tetrahydrofuran and added dropwise to a suspension of ten grams of lithium aluminum hydride in 200 milliliters of ether. The resulting mixture was stirred for five hours, then fifty milliliters of ethyl acetate was added cautiously, followed by addition of fifty milliliters of methanol and twenty milliliters of one normal sulfuric acid. The mixture was refluxed for fifteen minutes, cooled, and diluted with one normal sulfuric acid and ether. The ether and water layers were separated and the aqueous layer extracted several times with ether. The ether solutions were combined, washed with dilute sulfuric acid, then water, dried over sodium sulfate and evaporated to dryness leaving a residue. The residue was recrystallized from a mixture of ethyl acetate and Skellysolve B hexanes, giving 11β-hydroxy-5α-androstan-17-one having a melting point of 182 to 184 degrees centigrade and a rotation, $[\alpha]_D$, of plus 87 degrees in chloroform.

PREPARATION 5

9(11)-androsten-17-one

To a solution of five grams of 11β-hydroxyandrostan-17-one in 25 milliliters of pyridine was added three grams of N-bromoacetamide, with cooling. The mixture was stirred for five minutes then gaseous sulfur dioxide was passed over the surface of the stirred solution until the orange color of the solution faded. The reaction mixture was poured into a large volume of water giving five grams of a colorless solid which was dissolved in 25 milliliters of acetic acid to which five grams of zinc dust was then added. The resulting mixture was stirred sixteen hours, excess zinc was removed by filtration, and the filtrate was poured into a large volume of water giving a precipitate which was dried, dissolved in methylene chloride, and chromatographed over synthetic magnesium silicate. Development with one percent of acetone in petroleum ether gave 1.26 grams of 9(11)androsten-17-one having a melting point of 134 to 135 degrees centigrade, a rotation $[\alpha]_D$ of plus 142 degrees in chloroform and the following analysis:

Analysis.—Calculated for $C_{19}H_{28}O$: C, 83.77; H, 10.36. Found: C, 83.52; H, 10.41.

PREPARATION 6

11α-hydroxyandrostan-17-one

Following the procedure of Preparation 1, but substituting the 3-benzyl thioenol ether of 11α-hydroxyprogesterone (U. S. Patent 2,698,852) for the 3-benzyl thioenol ether of 11-ketoprogesterone as the starting steroid, there is thus produced 11α-hydroxy-3,5-pregnadien-20-one. Hydrogenating 11α-hydroxy-3,5-pregnadien-20-one in the manner described in Preparation 2 is productive of 11α-hydroxyallopregnan-20-one. Following the procedure of Preparation 3 but substituting 11α-hydroxyallopregnan-20-one for allopregnane-11,20-dione as the starting steroid is productive of 11α-acetoxyandrostan-17-one. The thus obtained 11α-acetoxyandrostan-17-one is dissolved in methanolic sodium hydroxide containing a small excess over the theoretical quantity of sodium hydroxide needed for saponification of the acetate group and is refluxed under a nitrogen atmosphere for two to five hours. Acetic acid is added to the resulting solution till slightly acid, then the solvent is removed by evaporation under diminished pressure and the residue is washed with water, leaving 11α-hydroxyandrostan-17-one.

EXAMPLE 1

17-isonitrosoandrostan-11β-ol

A solution of twenty grams of 11β-hydroxyandrostan-17-one and twenty grams of hydroxylamine hydrochloride in sixty milliliters of pyridine was heated on the steam bath for 4.25 hours. The reaction mixture was then poured into a large volume of water, giving a precipitate which was collected by filtration, washed with water, and dried to give 23 grams of 17-isonitrosoandrostan-11β-ol as solvated crystals having a melting point of ninety degrees centigrade, infrared absorption maxima at 3460, 3240, 3180 and 1670 reciprocal centimeters, and the following analysis:

Analysis.—Calculated for $C_{19}H_{31}NO_2$: C, 74.71; H, 10.24; N, 4.59. Found: C, 74.11; H, 10.53; N, 4.48.

A solution of 0.5 gram of the above 17-isonitrosoandrostan-11β-ol in a mixture of one milliliter of pyridine and one milliliter of acetic anhydride was allowed to stand at room temperature for 23 hours, then the reaction mixture was diluted with water giving a precipitate. The precipitate was collected by filtration, washed with water, and dried giving 0.56 gram of 17-isonitrosoandrostan-11β-ol O-acetate having a melting point of 180.5 to 188 degrees centigrade. This crude product was recrystallized from an ethermethylene chloride-Skellysolve B hexane mixture and gave 17-isonitrosoandrostan-11β-ol O-acetate having a melting point of 185 to 191 degrees centigrade and the following analysis:

Analysis.—Calculated for $C_{21}H_{33}NO_3$: C, 72,79; H, 9.31; N, 4.04. Found: C, 72.59; H, 8.96; N, 4.09.

EXAMPLE 2

17-isonitrosoandrostan-11α-ol

In the same manner as given in Example 1, treating 11α-hydroxyandrostan-17-one with hydroxylamine hydrochloride in pyridine is productive of 17-isonitrosoandrostan-11α-ol.

EXAMPLE 3

17-isonitrosoandrostan-11-one

A solution of ten grams of androstane-11,17-dione and ten grams of hydroxylamine hydrochloride in fifty milliliters of pyridine is allowed to stand at room temperature for one hour. The reaction mixture is then poured into a large volume of water, giving a precipitate of 17-isonitrosoandrostan-11-one which is collected by filtration.

EXAMPLE 4

17-isonitroso-9(11)-androstene

In the same manner as given in Example 1, treating 9(11)-androsten-17-one with hydroxylamine hydrochloride in pyridine is productive of 17-isonitroso-9(11)-androstene.

EXAMPLE 5

17-isonitrosoandrostane

In the same manner as given in Example 1, treating androstan-17-one (U. S. Patent 2,359,733) with hydroxylamine hydrochloride in pyridine is productive of 17-isonitrosoandrostane.

It is to be understood that this invention is not to be limited to the exact details of operation or exact compounds shown and described as obvious modifications and equivalents will be apparent to one skilled in the art and the invention is therefore to be limited only by the scope of the appended claims.

I claim:
1. 17-isonitroso androstane of the formula:

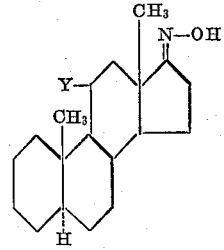

wherein Y is selected from the group consisting of hydrogen, α-hydroxy, β-hydroxy and keto.
2. 17-isonitrosoandrostan-11β-ol.
3. 17-isonitrosoandrostan-11α-ol.
4. 17-isonitrosoandrostan-11-one.
5. 17-isonitrosoandrostane.
6. 17-isonitroso-9(11)-androstene.

References Cited in the file of this patent

UNITED STATES PATENTS

| | | |
|---|---|---|
| 2,292,080 | Marker | Aug. 4, 1942 |
| 2,359,773 | Marker et al. | Oct. 10, 1944 |